(12) United States Patent
Dharmadhikari et al.

(10) Patent No.: US 11,467,929 B2
(45) Date of Patent: Oct. 11, 2022

(54) REDUCING FAILOVER TIME BETWEEN DATA NODES

(71) Applicant: EMC IP HOLDING COMPANY LLC, Hopkinton, MA (US)

(72) Inventors: Amit Dharmadhikari, Pune (IN); Adnan Sahin, Needham, MA (US); Ajay Potnis, Pune (IN)

(73) Assignee: Dell Products L.P., Hopkinton, MA (US)

( * ) Notice: Subject to any disclaimer, the term of this patent is extended or adjusted under 35 U.S.C. 154(b) by 471 days.

(21) Appl. No.: 16/561,073

(22) Filed: Sep. 5, 2019

(65) Prior Publication Data
US 2021/0073088 A1 Mar. 11, 2021

(51) Int. Cl.
*G06F 11/20* (2006.01)
*G06F 11/30* (2006.01)
*G06F 3/06* (2006.01)

(52) U.S. Cl.
CPC .......... *G06F 11/2023* (2013.01); *G06F 3/065* (2013.01); *G06F 3/067* (2013.01); *G06F 3/0619* (2013.01); *G06F 3/0647* (2013.01); *G06F 3/0683* (2013.01); *G06F 11/2076* (2013.01); *G06F 11/3034* (2013.01)

(58) Field of Classification Search
CPC .......... G06F 11/2071; G06F 11/2069; G06F 11/2023; G06F 11/3034; G06F 3/0647; G06F 3/0683
See application file for complete search history.

(56) References Cited

U.S. PATENT DOCUMENTS

| | | | | |
|---|---|---|---|---|
| 10,565,067 | B2* | 2/2020 | Dornemann | G06F 11/1469 |
| 10,776,209 | B2* | 9/2020 | Pawar | G06F 11/2094 |
| 10,877,928 | B2* | 12/2020 | Nagrale | G06F 11/1458 |
| 11,169,727 | B1* | 11/2021 | Doucette | G06F 3/065 |
| 2020/0327141 | A1* | 10/2020 | Thoppil | G06F 3/0649 |

* cited by examiner

*Primary Examiner* — Nadeem Iqbal
(74) *Attorney, Agent, or Firm* — Anderson Gorecki LLP

(57) ABSTRACT

A storage node that maintains a replica of a logical volume for use in response to a failover trigger includes a data node with volatile memory in which a filesystem and its metadata and a VDM and its metadata associated with the replica are maintained prior to the failover trigger. The storage node also includes a SAN node in which data associated with the replica is maintained. The data is maintained in a RW (read-write) state by the SAN node prior to the failover trigger. However, the replica is presented in a RO (read-only) state by the storage node prior to the failover trigger. The storage node changes the in-memory state of the filesystem and VDM to RW responsive to the failover trigger. Because the filesystem and its metadata and VDM and its metadata are already in memory and the data is in a RW state in block storage the failover is completed relatively quickly.

20 Claims, 4 Drawing Sheets

REDUCING FAILOVER TIME BETWEEN DATA NODES

TECHNICAL FIELD

The subject matter of this disclosure is generally related to data storage systems, and more particularly to failover between data nodes that maintain replicas of the same logical volume.

BACKGROUND

NAS (network-attached storage) can be used to provide multiple client computers with file-level access to the same logical volume of data. A NAS server may support file sharing protocols such as NFS (network file system), SMB (server message block), and AFP (apple filing protocol). The files that are stored by the NAS server on the logical volume may be presented in a folder or other standard OS (operating system) feature on each client computer.

A SAN (storage area network) can be used to provide multiple host servers with block-level access to the same logical volume of data. The SAN includes a network of compute nodes that manage access to arrays of drives. SANs create logical volumes of storage that are used by instances of host applications such as block servers and email servers that run on the host servers. Each logical volume has a volume ID and contiguous logical address space. The host servers send block-level IO (input-output) commands to the SAN to access the logical volumes. Because they are block-based, SANs are unaware of higher-level data structures such as files. SANs have advantages over NAS in terms of potential storage capacity and scalability, but file-based NAS systems may be preferred by some organizations based on ease of use.

Storage nodes combine the advantages of SAN storage capacity and scalability with the ease of use of NAS file-based access. Storage nodes provide clients computers with file-level data access while storing data on block-based SAN nodes. From the perspective of the client computers the storage node appears to be a standard NAS server that responds to file-level storage protocol messages. However, the storage node uses block-level commands to access the storage resources of the SAN node on which the data is stored. The storage node may support protocols such as iSCSI (internet small computer system interface) that are not typically supported by NAS servers but are more commonly supported by SANs.

It is known to configure pairs of storage nodes in a failover relationship. Clients access data from a logical volume maintained by a primary site storage node while a secondary site storage node maintains a replica of the logical volume and associated objects. More specifically, the replica and objects are maintained in a RO (read-only) state in the block-based non-volatile storage of the secondary site SAN node. In response to a failover trigger the RO block objects are retrieved from non-volatile storage of the secondary site SAN node and loaded into volatile memory on the secondary site NAS server. After configuration the replica is placed in a RW (read-write) state. The failover procedure may require several minutes to complete.

SUMMARY

All examples, aspects and features mentioned in this document can be combined in any technically viable way.

An apparatus in accordance with some aspects comprises: a storage node that maintains a replica of a logical volume for use in response to a failover trigger, the storage node comprising: a data node comprising a volatile memory in which a filesystem and its metadata associated with the replica is maintained prior to the failover trigger; and a SAN (storage area network) node in which data associated with the replica is maintained. In some implementations the data node maintains a VDM (virtual data mover) and its metadata associated with the replica in the volatile memory prior to the failover trigger. In some implementations the data is maintained in a RW (read-write) state by the SAN node prior to the failover trigger. In some implementations the replica is presented in a RO (read-only) state by the storage node prior to the failover trigger. In some implementations the storage node changes in-memory state of the filesystem and VDM to RW responsive to the failover trigger. In some implementations SDNAS (software-defined network attached storage) applications synchronize the replica with a primary site replica prior to the failover trigger.

In accordance with some aspects a method comprises: in a storage node comprising a data node and a SAN (storage area network) node, maintaining a replica of a logical volume for use in response to a failover trigger, steps comprising: maintaining a filesystem and its metadata associated with the replica in volatile memory of the data node prior to the failover trigger; and maintaining data associated with the replica in non-volatile storage of the SAN (storage area network) node prior to the failover trigger. Some implementations comprise the data node maintaining a VDM (virtual data mover) and its metadata associated with the replica in the volatile memory prior to the failover trigger. Some implementations comprise the SAN node maintaining the data in a RW (read-write) state prior to the failover trigger. Some implementations comprise the storage node presenting the replica in a RO (read-only) state prior to the failover trigger. Some implementations comprise the storage node changing in-memory state of the filesystem and VDM to RW responsive to the failover trigger. Some implementations comprise SDNAS (software-defined network attached storage) applications synchronizing the replica with a primary site replica prior to the failover trigger.

In accordance with some aspects an apparatus comprises: a first storage node that maintains a primary replica of a logical volume for use by at least one client computer prior to a failover trigger, the first storage node comprising: a first data node comprising a volatile memory in which a filesystem associated with the primary replica is maintained; and a first SAN (storage area network) node in which data associated with the primary replica is maintained; and a second storage node that maintains a secondary replica of the logical volume for use in response to the failover trigger, the second storage node comprising: a second data node comprising a volatile memory in which a filesystem and its metadata associated with the second replica is maintained prior to the failover trigger; and a second SAN (storage area network) node in which data associated with the second replica is maintained. In some implementations the second data node maintains a VDM (virtual data mover) and its metadata associated with the second replica in the volatile memory prior to the failover trigger. In some implementations the data is maintained in a RW (read-write) state by the second SAN node prior to the failover trigger. In some implementations the second replica is presented in a RO (read-only) state by the second storage node prior to the failover trigger. In some implementations the second storage node changes in-memory state of the filesystem and VDM to RW responsive to the failover trigger. In some implementations SDNAS (software-defined network attached storage) applications synchronize the second replica with the first replica prior to the failover trigger. In some implementations the first data node comprises a volatile memory in which a filesystem associated with the first replica is maintained prior to the failover trigger. In some implementations a VDM associated with the first replica is maintained in the volatile memory of the first data node prior to the failover trigger.

Various other aspects, features, and implementations will be apparent in view of the detailed description and figures.

DETAILED DESCRIPTION

Some aspects, features, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device, or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible non-transitory features. For example, a virtual storage device could be based on multiple physical storage drives. The term "logic" is used to refer to special purpose physical circuit elements and software instructions that are stored on a non-transitory computer-readable medium and implemented by general-purpose tangible processors.

Figure 1:
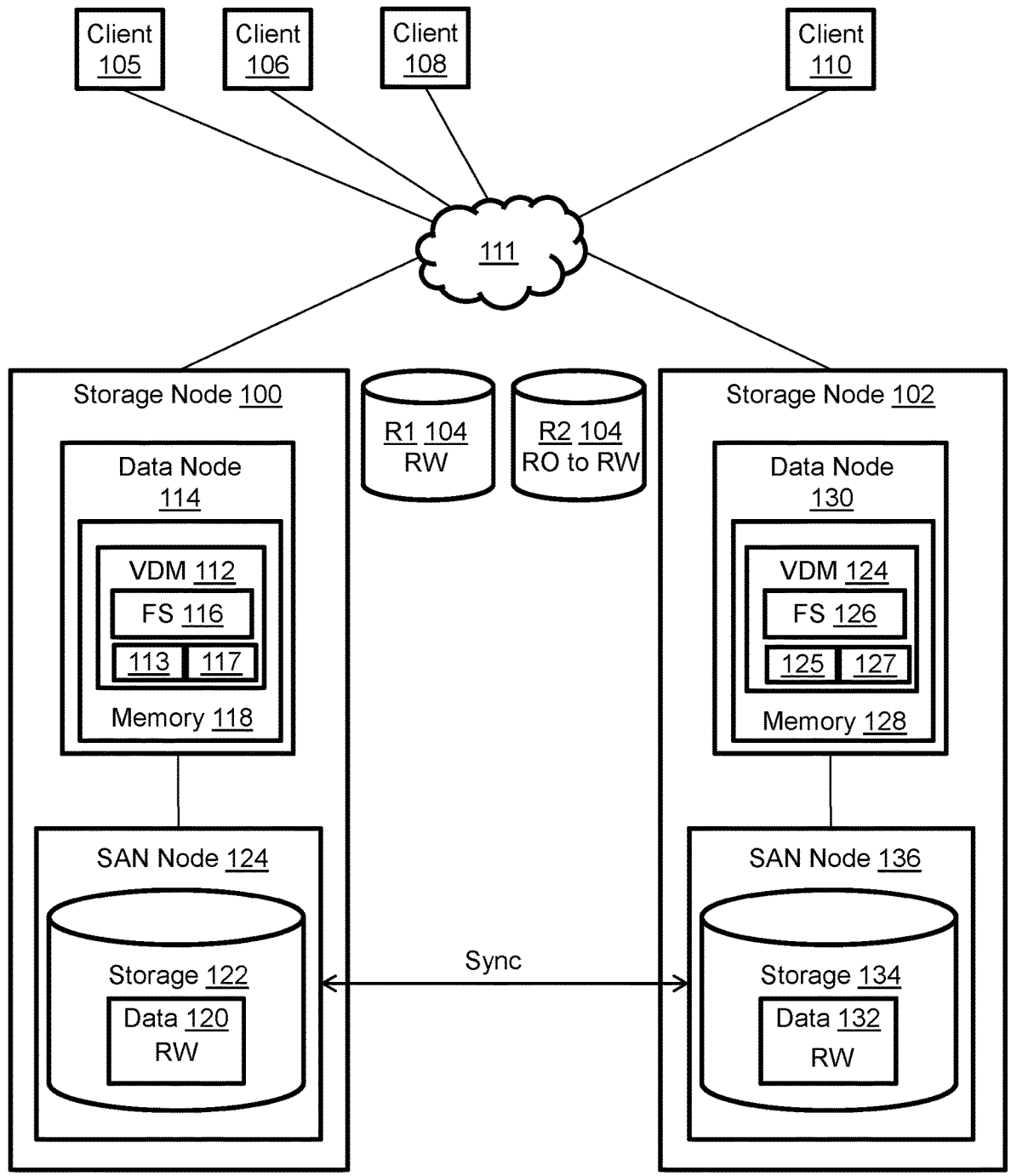
FIG. 1 illustrates primary and secondary storage nodes configured for fast failover.

Referring to FIG. 1, storage nodes 100, 102 are configured for replication and fast failover. The primary site storage node 100 maintains a primary replica R1 of a logical volume 104. The logical volume may have one or more volume IDs and contiguous logical address space that may be read from and/or written to by client computers 105, 106, 108, 110 via a network 111. The primary replica R1 is maintained in a RW (read-write) state, meaning that it can be read from and written to by the client computers. The client computers are provided with file-level access to the primary replica R1 by a VDM (virtual data mover) 112 running on a data node 114 of storage node 100. A user FS (filesystem) 116 for the primary replica R1 is maintained by the data node 114. More particularly, the VDM 112 and its metadata 113 and FS 116 and its metadata 117 are maintained in volatile memory 118 of the data node 114. The data 120 of the primary replica R1 is maintained in non-volatile storage 122 of a SAN node 124, although active data may be cached at various levels as understood in the art. Storage node 102 maintains a secondary replica R2 of the logical volume 104. The secondary replica is normally (before failover) maintained in a RO (read-only) state, i.e. it can be read from but not written to. A VDM 124 and its metadata 125 and user FS 126 and its metadata 127 for the secondary replica R2 are maintained in volatile memory 128 of data node 130 of storage node 102. The data 132 of the secondary replica R2 is maintained in non-volatile storage 134 of SAN node 136. The data 132 maintained by the secondary site storage node 102 is synchronized with the data 120 maintained by the primary site storage node 100, e.g. updated when client computers write changes to the primary site replica R1. As is understood in the art, replication may be synchronous or asynchronous while still being distinct from data backup. The block-based data 120, 132 at the SAN nodes of the primary and secondary sites is maintained in a RW state.

When configured as described above, the storage nodes 100, 102 can failover more quickly than implementations in which block objects and data at the secondary site are maintained only in non-volatile storage. Because the VDM 124 and its metadata 125 and FS 126 and its metadata 127 associated with the secondary replica R2 are normally maintained in the volatile memory 128 of the data node 130, delays associated with copying the objects from the SAN node 134 to the data node 130 memory are mitigated. Moreover, delays associated with updating state of the data 132 in the SAN node 134 are mitigated because the data 132 is normally maintained in a RW state rather than a RO state on the SAN node 136. Consequently, the state of the secondary replica R2 can be changed from RO to RW in response to failover more quickly.

Figure 2:
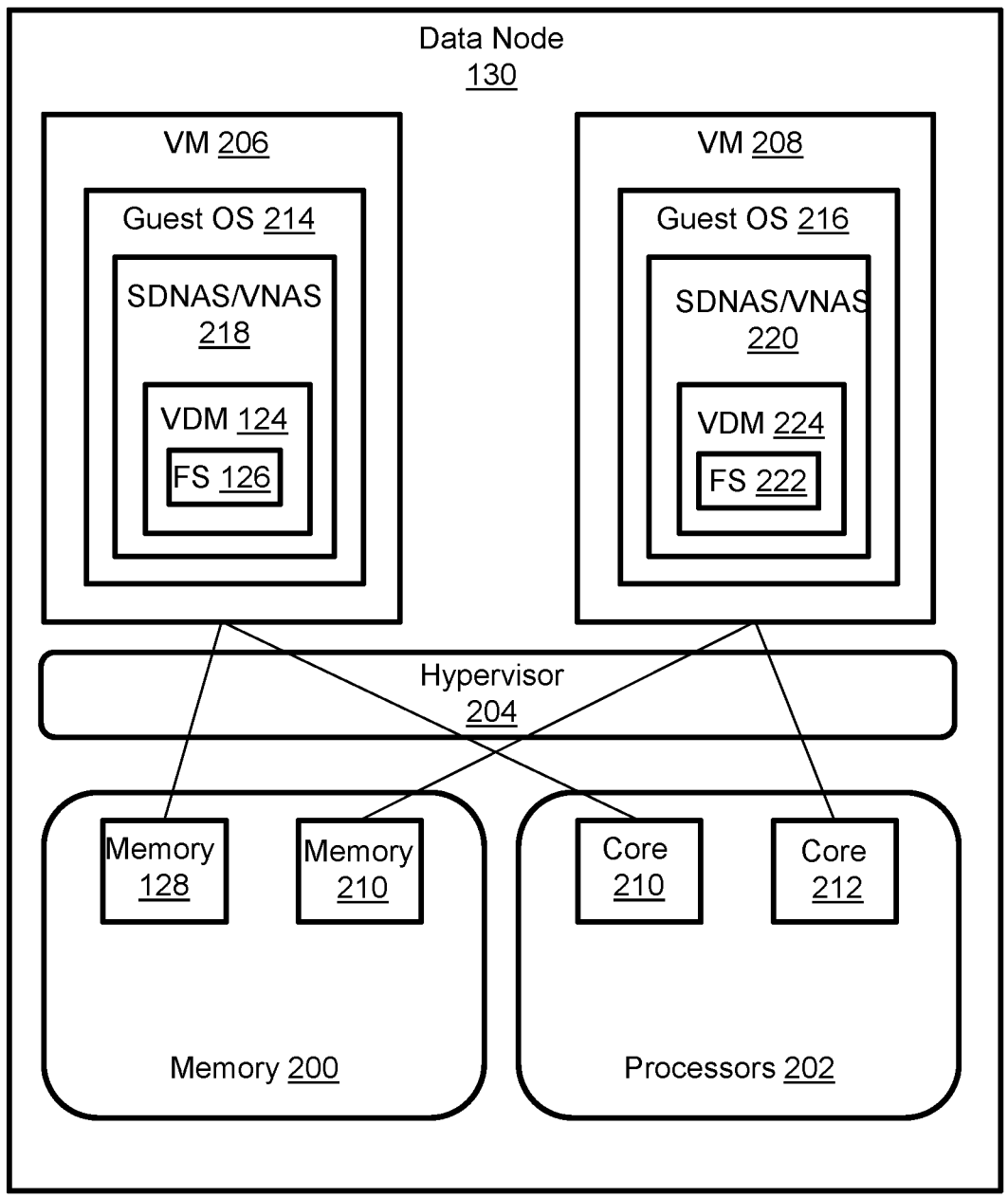
FIG. 2 illustrates a data node in greater detail.

FIG. 2 illustrates a data node in greater detail. The secondary site data node 130 is used as an example, but each of the data nodes may have the same or similar features. The data node 130 is a computer (such as a NAS server, for example and without limitation) with volatile memory 200 (e.g. RAM (random access memory of any type), tangible multi-core CPU processors 202, and a hypervisor 204. The hypervisor 204 manages allocation of the memory 200 and processors 202 to virtual machines 206, 208 (or containers). For example, memory 128 is a portion of the data node memory 200 that is allocated to VM 206 and core 210 is a core of the data node CPU processors 202 allocated to VM 206. VM 208 has a different allocation of memory 210 and processor cores, e.g. core 212. By allocating memory and processor resources the hypervisor helps to prevent VMs from using more than a predetermined share of the data node's memory and processing resources. Each VM has a guest OS (operating system). Guest OS 214 of VM 206 may be different than guest OS 216 of VM 208. The VMs host SDNAS (software-defined network attached storage) applications 218, 220. One example of a SDNAS application is a VNAS (virtual NAS) server. A VDM is a logical grouping of multiple file systems for easier management. The VDM may be implemented as a SDNAS application that helps to enable the VM to function as a VNAS server. VM 208 may maintain a FS 222 and VDM 224 for a logical volume other than logical volume 104 (FIG. 1), and the data node may implement many VMs.

Figure 3:
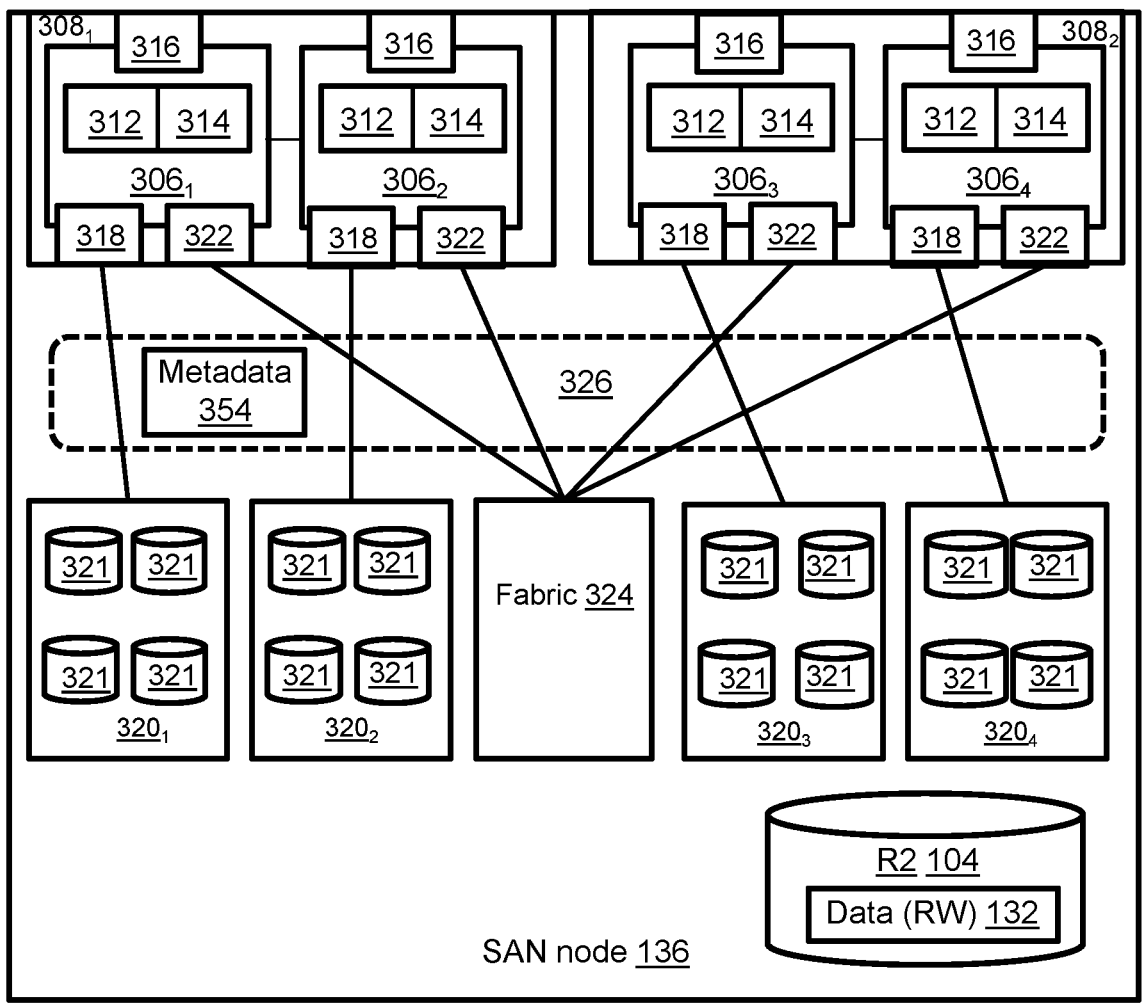
FIG. 3 illustrates a SAN node in greater detail.

FIG. 3 illustrates a SAN node 136 in greater detail. The secondary site SAN node 136 is used as an example, but each SAN node may have the same or similar features. The SAN node is a block-based storage array that includes a plurality of computing nodes $306_1$-$306_4$. Pairs of the computing nodes, e.g. ($306_1$, $306_2$) and ($306_3$, $306_4$), may be organized as storage engines $308_1$, $308_2$, respectively, for purposes of failover between computing nodes. The paired computing nodes of each storage engine may be directly interconnected by communication links. Each computing node includes at least one tangible multi-core CPU processor 312 and a local volatile memory 314. The local volatile memory 314 may include, for example and without limitation, components such as RAM of any type. Each computing node may include one or more FAs 316 (front-end adapters) for communicating with the data node. Each computing node $306_1$-$306_4$ may also include one or more BAs 318 (back-end adapters) for communicating with respective associated back-end drive arrays $320_1$-$320_4$, thereby enabling access to managed drives 321. The managed drives 321 may include tangible non-volatile storage components of one or more technology types, for example and without limitation SSDs (Solid State Drives) such as flash, and HDDs (hard disk drives). Each computing node may also include one or more CAs (channel adapters) 322 for communicating with other computing nodes via an interconnecting fabric 324. Each computing node may allocate a portion or partition of its respective local volatile memory 314 to a shared memory 326 that can be accessed by other computing nodes, e.g. via DMA (direct memory access) or RDMA (remote direct memory access).

The SAN node 136 maintains the data for the VNAS servers that run on the storage node 102 (FIG. 1), including data 132 of the secondary replica R2 of logical volume 104. VNAS server instances may write data to the logical volume and read data from the logical volume by sending commands to a SAN node that is in an active state, e.g. the primary site SAN node before failover and the secondary site SAN node after failover. The logical volume may be referred to as a TLU (thinly-provisioned logical unit) or LUN (Logical Unit Number), where LUN is used interchangeably to refer to the logical volume and an identification number used to designate the logical volume in accordance with the SCSI (Small Computer System Interface) protocol. The logical volume 104 is an abstraction layer between the managed drives 321 and the VNAS server instances. From the perspective of the storage node, the logical volume is a single data storage device having a set of contiguous fixed-size LBAs (logical block addresses) on which data 132 resides. However, the data 132 is maintained by the computing nodes $306_1$-$306_4$ at non-contiguous addresses on various managed drives 321 and the managed drives are not discoverable by the VNAS servers.

The SAN node 136 maintains metadata 354 in shared memory 326 that indicates, among various things, mappings between the storage space of the secondary replica R2 of the logical volume 104 and the locations of extents of data 132 on the managed drives 321. Following completion of failover to the secondary site storage node, the client computers send file-level storage protocol messages to the VNAS servers and the VNAS servers generate corresponding block-level storage commands. In the case of a read IO the SAN node uses the metadata 354 to locate the data/address space specified by the read IO, e.g. in the shared memory 326 or managed drives 321. If the data designated by the IO is not in the shared memory, then the data is temporarily copied into the shared memory from the managed drives and sent from shared memory to the data node via one of the computing nodes. In the case of a write IO the SAN node marks the associated metadata as dirty and creates new metadata that maps the logical volume address with a location to which the new/changed data is written on the managed drives. The shared memory 326 may enable the logical volume to be reachable via all the computing nodes and paths, although the SAN node can be configured to limit use of certain paths to certain volumes. Further, maintenance of the metadata 354 associated with the logical volume 104 in shared memory 326 facilitates quick failover from the primary replica R1 to the secondary replica R2.

Figure 4:
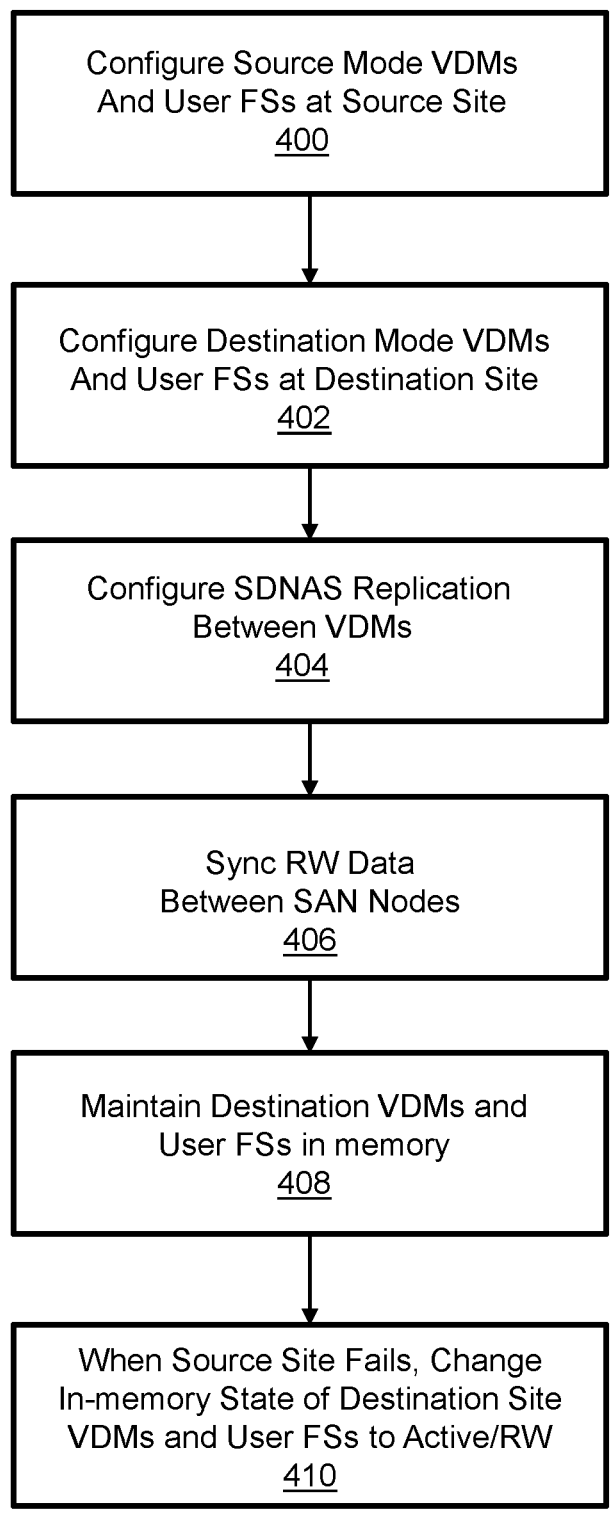
FIG. 4 illustrates a method in accordance with FIGS. 1 through 3.

FIG. 4 illustrates a method for maintaining primary and secondary replicas R1, R2 and implementing failover between the replicas. As indicated in step 400 the VDMs and user FSs at the source site storage node are configured in "source mode" so that the primary (production) replica is accessible to the client computers via the primary site storage node. As indicated in step 402 the corresponding VDMs and user FSs at the destination site storage node are configured in "destination mode" so that the secondary replica can be made accessible to the client computers via the secondary site storage node in the event of failover from the primary site to the secondary site. As indicated in step 404, SDNAS replication is configured between corresponding VDMs. In other words, synchronization between the replicas is performed with the assistance of SDNAS applications. RW state data is synchronized between the SAN nodes as indicated in step 406. The use of RW state on the secondary site SAN node facilitates failover because the state of the data does not need to be changed in response to a failover trigger. As indicated in step 408, the destination VDMs and user FSs are maintained in volatile memory of the secondary site data node. The presence of the VDMs and FSs in memory of the data node rather than as block storage objects in managed drives of the SAN node facilitates failover. As indicated in step 410, when the source site fails or becomes inaccessible to the client computers the in-memory state of the destination site VDMs and user FSs is changed from RO to active/RW. Because the VDMs and FSs are already in memory and the data is already in the RW state in the SAN node the failover may be completed in seconds rather than minutes, although this should not be viewed as a limitation.

It is recognized by those of ordinary skill in the art that data backup and data replication are distinctly different storage services. Data backup helps to avoid data loss. Data replication helps to assure data availability. Data backup may be implemented by periodically copying data from a storage array to relatively low performance storage resources. For example, the storage array may use high performance SSDs (solid state devices) such as flash drives whereas a backup site for that storage array may use less costly low performance spinning disk media or tape drives. The backup site may be at a different geographical location from the production site in order to reduce the likelihood of destruction of both systems in the event of a disaster. Backups may be performed relatively infrequently in order to avoid degradation of the performance of the production site being backed up. For example, and without limitation, backups may be performed daily or weekly. As a result, the backup copy is not synchronized with the production site data being backed up. Backups are useful for disaster recovery because the backup copy is likely to survive a disaster that destroys the production site. However, recovering from a disaster using a backup copy interrupts the host applications, may require considerable down time, and is not transparent to the users. In contrast with data backup, data replication facilitates data availability by helping to provide less disruptive failover capability. Data availability is sometimes quantified as the percentage of time that a host application is working, and the host data is accessible. Data availability may be provided by maintaining a failover data storage system that has the same performance capabilities as a primary data storage system. For example, a production site storage array with a given IOPS (input-output operations per second) capability may be paired with an identical failover site storage array with the same IOPS capability. A replica of the data set on the production site storage array is maintained on the failover site storage array. Changes to the data set are implemented on both the production site storage array and the failover site storage array. For example, changes may be synchronously written to the production site storage array and backup site storage array. Synchronous writes enable the replica to be synchronized with the production site data set being replicated. In a failover situation the failover site storage array will quickly take over for the production site storage array by using the replica. The failover can potentially be transparent to the users, e.g. without interrupting host applications and without a noticeable loss of performance, because the recovery time provided by a failover site storage array with a replica is much faster than retrieval of backup data and disaster recovery procedures.

Specific examples have been presented for context and to help convey inventive concepts. The specific examples are not to be considered as limiting the invention. A wide variety of modifications may be made without departing from the scope of the inventive concepts described herein. Moreover, the features, aspects, and implementations described herein may be combined in any technically conceivable way. Accordingly, modifications and combinations are within the scope of the following claims.

What is claimed is:

1. An apparatus comprising:
a storage node that maintains a replica of a logical volume for use in response to a failover trigger, the storage node comprising:
a data node comprising a volatile memory in which a filesystem and its metadata associated with the replica is maintained prior to the failover trigger; and
a SAN (storage area network) node comprising a plurality of interconnected computing nodes configured to manage access to managed drives in which data associated with the replica is maintained.

2. The apparatus of claim 1 wherein the data node maintains a VDM (virtual data mover) and its metadata associated with the replica in the volatile memory prior to the failover trigger.

3. The apparatus of claim 2 wherein the data is maintained in a RW (read-write) state by the SAN node prior to the failover trigger.

4. The apparatus of claim 3 wherein the replica is presented in a RO (read-only) state by the storage node prior to the failover trigger.

5. The apparatus of claim 4 wherein the storage node changes in-memory state of the filesystem and VDM to RW responsive to the failover trigger.

6. The apparatus of claim 5 wherein SDNAS (software-defined network attached storage) applications synchronize the replica with a primary site replica prior to the failover trigger.

7. A method comprising:
in a storage node comprising a data node and a SAN (storage area network) node comprising a plurality of interconnected computing nodes configured to manage access to managed drives, maintaining a replica of a logical volume for use in response to a failover trigger, steps of the method comprising:
maintaining a filesystem and its metadata associated with the replica in volatile memory of the data node prior to the failover trigger; and
maintaining data associated with the replica in the managed drives of the SAN node prior to the failover trigger.

8. The method of claim 7 comprising the data node maintaining a VDM (virtual data mover) and its metadata associated with the replica in the volatile memory prior to the failover trigger.

9. The method of claim 8 comprising the SAN node maintaining the data in a RW (read-write) state prior to the failover trigger.

10. The method of claim 3 comprising the storage node presenting the replica in a RO (read-only) state prior to the failover trigger.

11. The method of claim 10 comprising the storage node changing in-memory state of the filesystem and VDM to RW responsive to the failover trigger.

12. The method of claim 11 comprising SDNAS (software-defined network attached storage) applications synchronizing the replica with a primary site replica prior to the failover trigger.

13. An apparatus comprising:
a first storage node that maintains a primary replica of a logical volume for use by at least one client computer prior to a failover trigger, the first storage node comprising:
a first data node comprising a volatile memory in which a filesystem associated with the primary replica is maintained; and
a first SAN (storage area network) node comprising a plurality of interconnected computing nodes configured to manage access to managed drives in which data associated with the primary replica is maintained; and
a second storage node that maintains a secondary replica of the logical volume for use in response to the failover trigger, the second storage node comprising:
a second data node comprising a volatile memory in which a filesystem associated with the second replica is maintained prior to the failover trigger; and
a second SAN (storage area network) node comprising a plurality of interconnected computing nodes configured to manage access to managed drives in which data associated with the second replica is maintained.

14. The apparatus of claim 13 wherein the second data node maintains a VDM (virtual data mover) associated with the second replica in the volatile memory prior to the failover trigger.

15. The apparatus of claim 14 wherein the data is maintained in a RW (read-write) state by the second SAN node prior to the failover trigger.

16. The apparatus of claim 15 wherein the second replica is presented in a RO (read-only) state by the second storage node prior to the failover trigger.

17. The apparatus of claim 16 wherein the second storage node changes in-memory state of the filesystem and VDM to RW responsive to the failover trigger.

18. The apparatus of claim 17 wherein SDNAS (software-defined network attached storage) applications synchronize the second replica with the first replica prior to the failover trigger.

19. The apparatus of claim 18 wherein the first data node comprises a volatile memory in which a filesystem associated with the first replica is maintained prior to the failover trigger.

20. The apparatus of claim 19 wherein a VDM associated with the first replica is maintained in the volatile memory of the first data node prior to the failover trigger.

* * * * *